United States Patent Office.

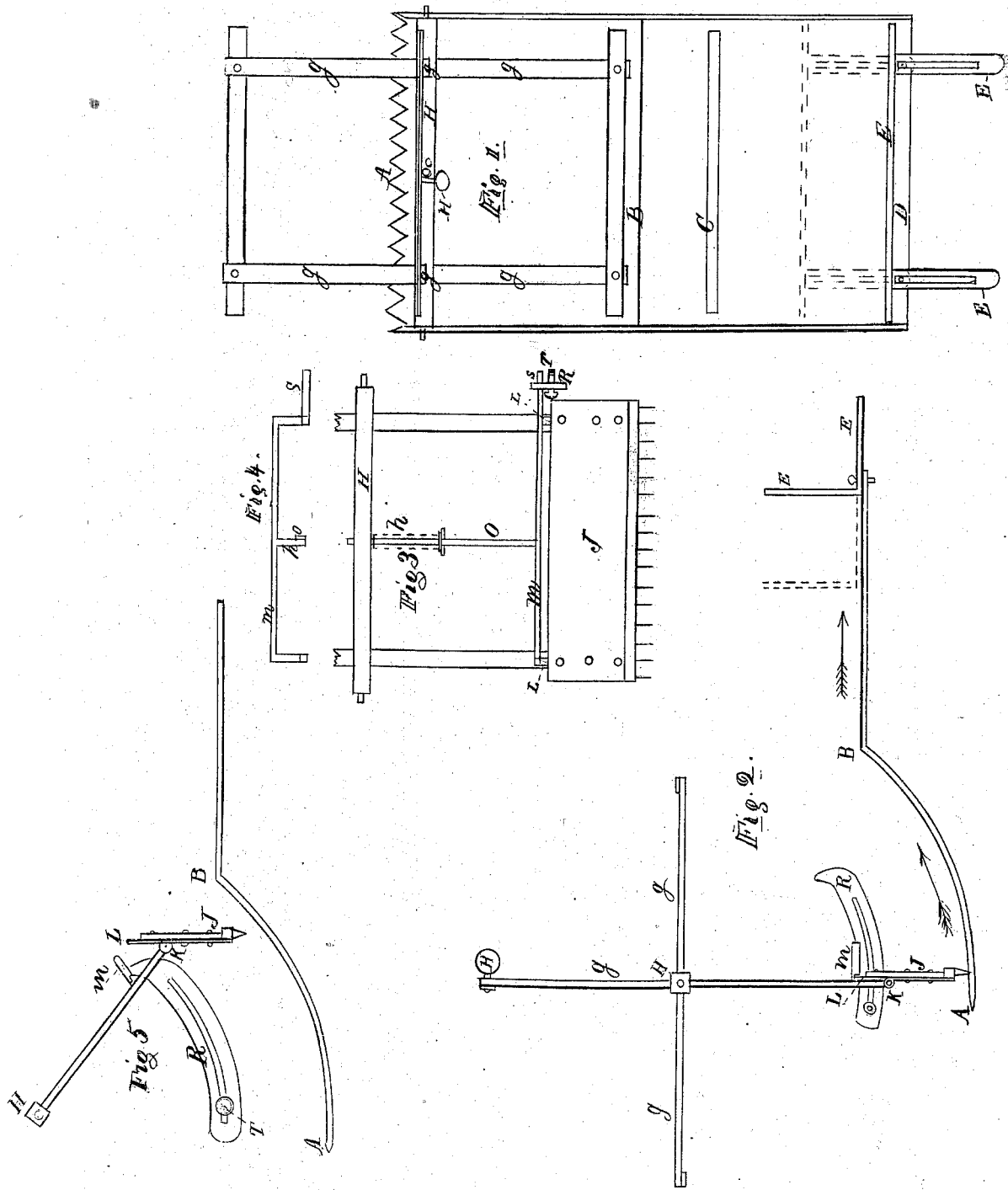

ISRAEL LANCASTER, OF BALTIMORE, MARYLAND.

Letters Patent No. 67,888, dated August 20, 1867.

IMPROVEMENT IN HARVESTER-RAKES.

*The Schedule referred to in these Letters Patent and making part of the same.*

TO ALL WHOM IT MAY CONCERN:

Be it known that I, ISRAEL LANCASTER, of Baltimore, in the county of Baltimore, in the State of Maryland, have invented a new and improved Mode of Placing Grain on the Platforms of Grain-Binders; and I do hereby declare that the following is a full and exact description thereof, reference being had to the accompanying drawings, and to the letters of reference marked thereon.

The nature of my invention consists in providing a rake which strikes the grain parallel with the cutting-bar of the reaper, and which carries it back and drops it anywhere desired on the platform of the binder, and an adjustable fender, placed on the rear of the binder-platform, against which the grain is carried by the rake.

To enable others skilled in the art to make and use my invention, I will proceed to describe its construction and operation.

Figure 1 is a plan of the reaper and binder-platform, showing the position of the rake and fender.

Figure 2 is an elevation of the rake and fender, seen from the end next the standing grain.

Figure 3 is a side elevation of the rake-shaft and rake.

Figure 4 is an elevation of the angular rod which holds and releases the rake at the proper time.

Figure 5 shows the position of the rake after the delivery of a sheaf on the binder-platform.

A represents the cutting-bar of the reaper. From A to B is the reaper platform, upon which rests the sheaf of grain while being cut. C, fig. 1, represents the slot in the binder-platform, through which the band-carrier of the binder operates. From B to D is the binder-platform. E E E is the fender, adjustable by means of the set-screws and slots. F, fig. 2, is the rake and reel-shaft. G G G are the reel-arms. H is a weight counterbalancing the rake. I is the rake, swinging on the hinge $k$, and held in its position by means of the lips L L, resting in the notches in the bar M, also shown at fig. 3. These notches are held against the ends of the lips L L by means of the spiral spring $h$, fig. 3, operating the rod O, which is attached to the bar M by the angle or arm $p$, fig. 4. R, figs. 2 and 5, is the stop operating the end S of the bar M, to deliver the sheaf at the proper time. This stop is adjustable by means of the set-screw T and slot.

The rake strikes the gavel at the point A, and carries it in the direction of the arrows to the point B. Here the arm S strikes the stop R, which partially revolves the arm M, thus withdrawing the notches from the ends of the lips L L, letting the rake drop from its own weight and the resistance of the gavel to the position shown in fig. 5. Its own weight carries it into position again as it reaches the point A in its revolution on its axis F. The delivery of the gavel can be effected anywhere on the surface A B to suit the length of grain, by moving the stop R.

When the motion of the rake is very rapid, or the grain very short, the gavel is liable to be thrown too far. This is remedied by the fender E being moved so that the heads of the gavel will strike it at the proper place.

What I claim as my invention, and desire to secure by Letters Patent, is—

The application to reapers, with grain-binding attachment, having the platform in the rear of the reaper-platform, and parallel to it, of rake and fender, constructed and operated substantially as described and for the purpose mentioned.

ISRAEL LANCASTER. [L. S.]

Witnesses:
 RHD. PLUMMER,
 F. W. PLUMMER.